(12) United States Patent
Abolfathi

(10) Patent No.: US 10,958,015 B1
(45) Date of Patent: Mar. 23, 2021

(54) VEHICLE HEATER DECOUPLING SYSTEM

(71) Applicant: Hossein Abolfathi, Edmonton (CA)

(72) Inventor: Hossein Abolfathi, Edmonton (CA)

( * ) Notice: Subject to any disclaimer, the term of this patent is extended or adjusted under 35 U.S.C. 154(b) by 69 days.

(21) Appl. No.: 16/362,642

(22) Filed: Mar. 23, 2019

(51) Int. Cl.
*F02D 41/06* (2006.01)
*H01R 13/633* (2006.01)
*H01R 13/66* (2006.01)
*F02N 19/02* (2010.01)

(52) U.S. Cl.
CPC ......... *H01R 13/633* (2013.01); *F02D 41/068* (2013.01); *F02N 19/02* (2013.01); *H01R 13/6683* (2013.01)

(58) Field of Classification Search
CPC ..... F02D 41/068; F02N 19/02; H01R 13/633; H01R 13/6683
USPC .................................................. 307/9.1, 10.1
See application file for complete search history.

(56) References Cited

U.S. PATENT DOCUMENTS

2007/0057563 A1* 3/2007 Taguchi ............. B60N 2/01508
297/463.1

* cited by examiner

*Primary Examiner* — William Hernandez
(74) *Attorney, Agent, or Firm* — Gulf Coast Intellectual Property Group

(57) ABSTRACT

A vehicle heater decoupling system that facilitates an automated decoupling of the vehicle heater with a power cord plug operably coupled thereto. The present invention includes a receptacle that is configured with a disconnection member. The disconnection member is operably coupled to electrical connection members that are electrically coupled to the power cord plug. A sensor is present to provide detection of the power cord plug. A controller is disposed within the passenger compartment of the vehicle and is coupled to the electrical system of the vehicle. The controller is configured to detect the operational status of the motor of the vehicle specifically whether the motor is running or idle. The controller detects the ignition of the motor and the state of the receptacle and upon detection of the ignition of the motor and the first state the controller transmits a signal to eject the power cord plug.

19 Claims, 2 Drawing Sheets

VEHICLE HEATER DECOUPLING SYSTEM

FIELD OF THE INVENTION

The present invention relates generally to vehicle safety systems, more specifically but not by way of limitation, a vehicle heater system that is operable to detect when the heater is coupled to a power source and further is operable to facilitate automatic decoupling from the power source upon detection of ignition of the motor of the vehicle.

BACKGROUND

As is known in the art, in cold climates it is common for owners of vehicles to electrically couple their vehicle to a power source. Combustible motors must ensure that the oil, coolant and core must not dip below a certain temperature. If a vehicle motor is attempted to be started at a temperature that is very cold either the motor will not start or damage could occur to the motor as a result of the lack of initial distribution of oil lubricant.

During the winter season in climates that experience well below freezing temperatures it is common for vehicle owners to electrically couple the vehicle to a power source. The vehicle is equipped with an electric heater that is designed to maintain the temperature of the motor at a temperature that prevents damage thereto that can be caused by cold temperatures. The owner of the vehicle will plug in their vehicle utilizing a conventional extension cord typically in the evening prior to cold weather expectations. When the owner is ready to utilize the vehicle, the electrical connection must be decoupled which essentially entails unplugging the electrical extension cord that has been coupled to the heater cord of the vehicle. While the aforementioned is a common task, there is often an occurrence wherein a distracted or hurried individual will forget to disconnect the heater cord and drive off which can result in significant damage.

It is intended within the scope of the present invention to provide a vehicle heater decoupling system that is configured to detect the heater cord status and provide an automated disconnection of the heater cord of the vehicle and a power source cord upon ignition of the engine of the vehicle.

SUMMARY OF THE INVENTION

It is the object of the present invention to provide a vehicle heater decoupling system that is configured to provide automated disconnection of the vehicle heater and a power source cord wherein the system of the present invention includes an electrical plug on the vehicle heater that is operable to detect electrical coupling with a power source cord.

Another object of the present invention is to provide a vehicle heater decoupling system that is configured to ensure the disconnection of the vehicle heater prior to movement of the vehicle wherein the present invention includes a plug on the heater cord that utilizes a pressure pad to determine the presence of a connection with a power source cord.

A further object of the present invention is to provide a vehicle heater decoupling system that is configured to provide automated disconnection of the vehicle heater and a power source cord wherein the receptacle of the heater cord on the vehicle of the present system includes a disconnection member that is configured to provide mechanical discharge of the plug of the electrical source power cord.

Still another object of the present invention is to provide a vehicle heater decoupling system that is configured to ensure the disconnection of the vehicle heater prior to movement of the vehicle wherein the receptacle of the present invention is further configured with a sensing switch that is operable to determine an electrical connection with a plug of a power cord.

An additional object of the present invention is to provide a vehicle heater decoupling system that is configured to provide automated disconnection of the vehicle heater and a power source cord that further includes a controller wherein the controller is communicably coupled to the receptacle of the present invention.

Yet a further object of the present invention is to provide a vehicle heater decoupling system that is configured to ensure the disconnection of the vehicle heater prior to movement of the vehicle wherein the controller is electrically coupled to the vehicle and configured to determine the motor status of the vehicle.

Another object of the present invention is to a provide a vehicle heater decoupling system that is configured to provide automated disconnection of the vehicle heater and a power source cord wherein the controller is operable to transmit a disconnection signal to the receptacle of the present invention in the event of the detection of the receptacle being coupled to a plug and the motor has been detected as being turned on.

An alternate object of the present invention is to provide a vehicle heater decoupling system that is configured to ensure the disconnection of the vehicle heater prior to movement of the vehicle wherein the controller is electrically coupled to the vehicle utilizing a port such as but not limited to a USB port or a twelve-volt port.

Still a further object of the present invention is to provide a vehicle heater decoupling system that is configured to provide automated disconnection of the vehicle heater and a power source cord wherein the controller further includes a visual status indicator thereon that is visible to the operator of the vehicle.

An additional object of the present invention is to provide a vehicle heater decoupling system that is configured to ensure the disconnection of the vehicle heater prior to movement of the vehicle wherein the visual status indicator is configured to provide a visual alert to a user in the event the automated disconnection of the receptacle and the power plug is unsuccessful.

A further object of the present invention is to provide a vehicle heater decoupling system that is configured to provide automated disconnection of the vehicle heater and a power source cord wherein the controller is further configured to provide an audio alarm in the event the automated disconnection of the receptacle and the power plug is unsuccessful.

An alternative objective of the present invention is to provide a vehicle heater decoupling system that is configured to ensure the disconnection of the vehicle heater prior to movement of the vehicle wherein the controller and receptacle of the present invention are communicably coupled utilizing wireless communication protocols such as but not limited to RF or Bluetooth.

Yet a further object of the present invention is to provide a vehicle heater decoupling system that is configured to provide automated disconnection of the vehicle heater and a power source cord wherein the visual status indicator is configured to provide a visual alert to a user in the passenger cabin of the vehicle that the automated disconnection of the receptacle and the power plug was successful.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
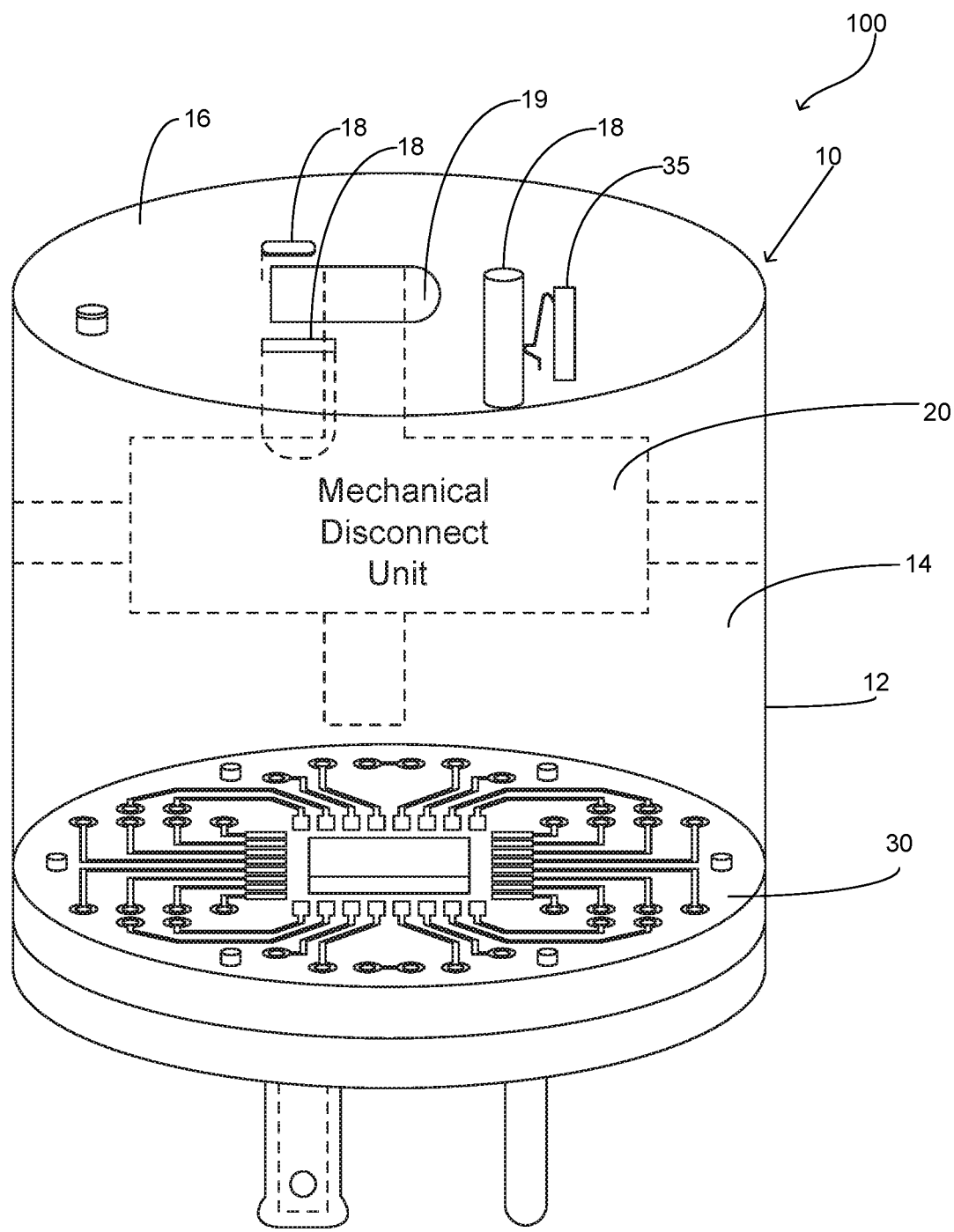
FIG. 1 is diagrammatic view of the receptacle of the present invention.
Figure 2:
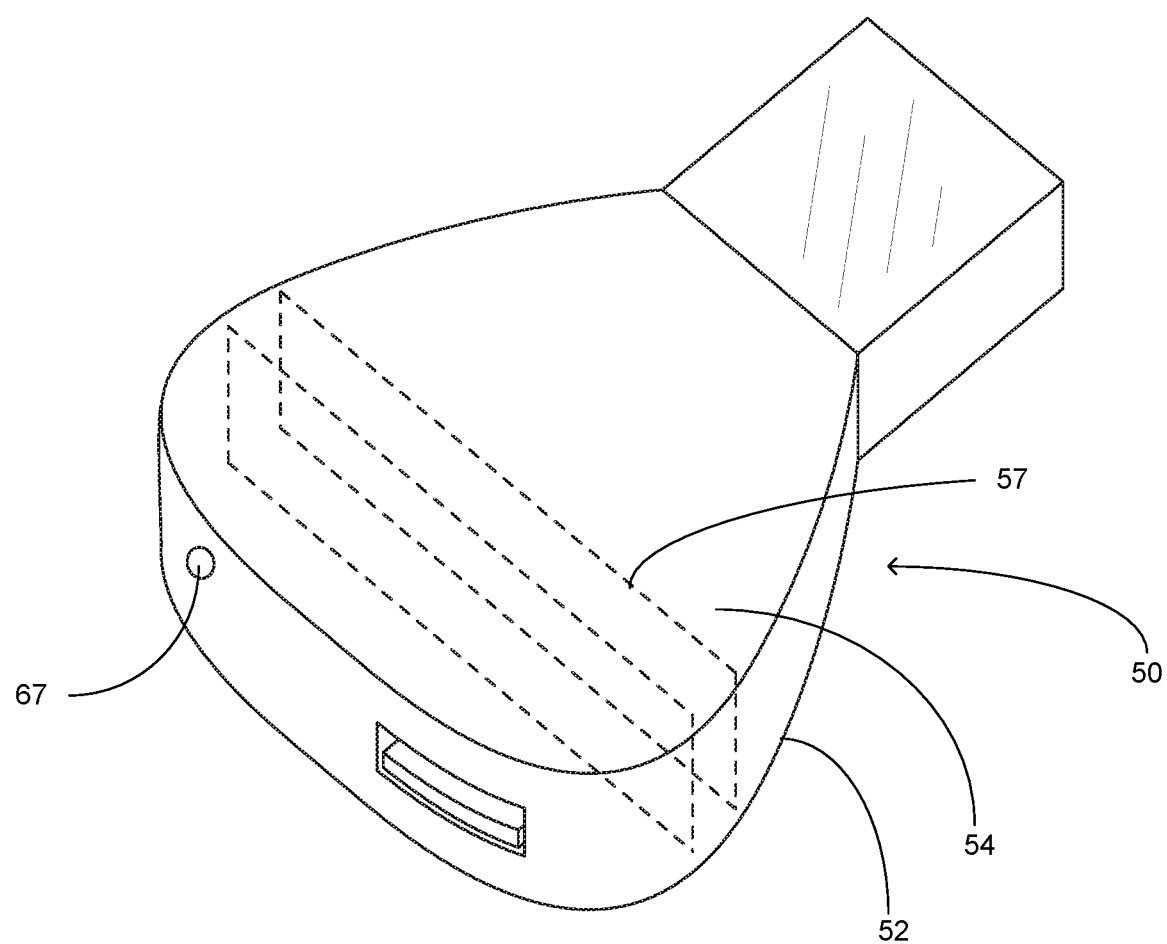
FIG. 2 is a perspective diagrammatic view of the controller of the present invention.

Referring now to the drawings submitted herewith, wherein various elements depicted therein are not necessarily drawn to scale and wherein through the views and figures like elements are referenced with identical reference numerals, there is illustrated a vehicle heater decoupling system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to the Figures submitted herewith, the vehicle heater decoupling system 100 further includes a receptacle 10. The receptacle 10 includes a housing 12 that is manufactured from a suitable insulative material such as but not limited to plastic. The housing 12 has an interior volume 14 being of suitable size to accommodate operational components therein. The housing 12 includes faceplate 16 at the top end 11 thereof wherein the faceplate is configured with the necessary electrical connection members 18 configured to provide an electrical connection with a conventional plug of a power cord (not illustrated herein). It should be understood within the scope of the present invention that the electrical connection members 18 could be operably configured to mechanically receive either a one hundred and twenty volt electrical plug or a two hundred and twenty volt electrical plug. Furthermore, while not particularly illustrated herein, it should be understood within the scope of the present invention that the vehicle heater decoupling system 100 includes an electrical cord or the additional necessary elements to facilitate electrical connection to the vehicle in which the vehicle heater decoupling system 100 is mounted.

The receptacle 10 includes a disconnection member 20. The disconnection member 20 is configured to provide the mechanical disconnection of the receptacle 10 and a power cord plug that has been electrically coupled thereto. The disconnection member 20 is operably coupled to the control board 30 wherein the control board 30 is configured to provide the data signal to initiate the disconnection of the receptacle 10 and the power cord plug operably coupled thereto. It is contemplated within the scope of the present invention that the disconnection member 20 could include an employ various mechanical elements to facilitate the decoupling of the receptacle and the plug of a power cord. By way of example but not limitation, the disconnection member 20 could utilize springs or pins that are configured to provide mechanical ejection of the power plug operably coupled with the electrical connection members 18. Additionally, the disconnection member 20 could have a pressure plate 19 formed in the faceplate 16 wherein the pressure plate 19 is configured to eject the power plug through movement thereof. As will be further discussed herein, the control board 30 is operably coupled to the controller 50 and will receive a signal therefrom upon ignition of the motor of the vehicle in which the vehicle heater decoupling system 100 is installed. If the receptacle 10 is electrically coupled to a power plug upon detection of the ignition of the motor of the vehicle, the control board 30 will transmit a signal to the disconnection member 20 to eject the power plug cord operably coupled thereto.

The receptacle 10 further includes a sensor 35. Sensor 35 is operably coupled at least one electrical connection member 18. The sensor 35 is configured to detect the presence of a prong of a power cord that is electrically coupled to the electrical connection members 18. The sensor 35 transmits information about a first state and a second state. In the first state, the sensor 35 detects the presence of a power plug coupled with the receptacle 10 and transmits a signal to the control board 30 and subsequently the control board 30 communicates the first state to the controller 50. The second state comprises the detection of the lack of the presence of a power plug engaged with the receptacle wherein this state is also transmitted in the same manner as the first state. As will be further discussed herein, the controller 50 will be placed in either a first mode or second mode depending upon the state information transmitted thereto. It should be understood within the scope of the present invention that the sensor 35 could be coupled to one or all of the electrical connection members 18.

The controller 50 is configured to be disposed within the passenger cabin of the vehicle in which the vehicle heater decoupling system 100 is installed. The controller 50 is electrically coupled to the vehicle utilizing conventional electrical connections such as but not limited to a USB port or a twelve-volt adapter plug. The controller 50 includes a housing 52 that is manufactured from a suitable durable material such as but not limited to plastic. The housing 52 forms an interior volume 54 that is of suitable size to accommodate the operational components of the controller 50. It should be understood within the scope of the present invention that the housing 50 could be manufactured in alternate shapes and/or sizes.

The controller 50 leverages its electrical connection with the vehicle to detect the status of the motor in the vehicle. In particular, controller 50 utilizes mainboard 57 and the components thereof to detect whether the vehicle is in a first mode or a second mode. In the first mode, the controller 50 determines that the motor of the vehicle in which the vehicle heater decoupling system 100 is mounted is not turned on. The controller 50 executes the aforementioned through monitoring if the ignition system of the vehicle wherein the ignition system is electrically coupled to the electrical port in which the controller is installed. In the second mode, the controller 50 has determined that the motor of the vehicle in which the vehicle heater decoupling system 100 is installed has been turned on and is running. In the second mode, the visual indicator 67 is illuminated so as to provide a visual signal to a user that the motor is in a running state.

Ensuing detection of the second mode, the controller 50 transmits a signal to the receptacle 10 to eject the electrical connection with a power cord to which the receptacle 10 is coupled. In the event that the decoupling of the receptacle 10 and a power cord is unsuccessful, the controller 50 will provide notification to a user via the visual indicator 67 and an audio alarm that is integrated onto mainboard 57. The visual indicator 67 will flash a red color and further be illuminated in a pattern that will attract the attention of a person disposed within the passenger cabin of the vehicle in which the vehicle heater decoupling system 100 is mounted. It is contemplated within the scope of the present invention that the visual indicator 67 could be illuminated in alternate colors and patterns to provide visual notification that the receptacle 10 and a cord operably coupled therewith were not disconnected.

The controller 50 further includes a third mode. In the third mode of the controller 50 the controller 50 is communicably coupled to a key fob that is utilized to provide locking an unlocking of the doors of the vehicle in which the vehicle heater decoupling system 100 is installed. In the third mode, when a key fob is engaged to unlock the doors of the vehicle in which the vehicle heater decoupling system 100 is installed, the controller 50 transmits a signal to the receptacle 10 to disconnect any electrical cord operably coupled thereto utilizing the disconnection member 20.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A vehicle heater decoupling system installed in a vehicle that is operable to ensure disconnection of a vehicle heater and its power source wherein the vehicle heater decoupling system comprises:
    a receptacle, said receptacle being electrically coupled to a heater installed in a vehicle, said receptacle being configured to be electrically coupled to a plug of a power cord, said power cord being operable to provide electrical current, said receptacle having electrical connection members, said electrical connection members operable to engage a plug of said power cord;
    a disconnection member, said disconnection member being disposed within said receptacle, said disconnection member configured to disengage the plug of said power cord;
    a controller, said controller being operably coupled to said receptacle, said controller being electrically coupled with the vehicle, said controller configured to detect a first state and a second state of the receptacle, said controller further configured to detect a first mode or a second mode of the vehicle; and
    wherein the controller is operable to eject the plug upon detection of the first state and the second mode concurrently.

2. The vehicle heater decoupling system as recited in claim 1, wherein in the first state the receptacle has the plug coupled thereto.

3. The vehicle heater decoupling system as recited in claim 2, wherein in said second mode said vehicle is in running status.

4. The vehicle heater decoupling system as recited in claim 3, wherein in the second state the receptacle has the plug disconnected therefrom.

5. The vehicle heater decoupling system as recited in claim 4, wherein said receptacle further includes a sensor, said sensor configured to provide detection of said first state and said second state.

6. The vehicle heater decoupling system as recited in claim 5, wherein said controller is configured with a visual indicator and an audio alarm that are operable to provide notification to a user in the event the plug is not successfully disconnected from said receptacle.

7. A vehicle heater decoupling system installed in a vehicle that is operable to ensure disconnection of a vehicle heater and its power source wherein the vehicle heater decoupling system comprises:
    a receptacle, said receptacle having a housing, said housing defining an interior volume, said housing further including a faceplate, said receptacle being electrically coupled to the vehicle heater installed in the vehicle, said receptacle being configured to be electrically coupled to a plug of a power cord coupled to a power source, said power cord being operable to provide electrical current, said receptacle having electrical connection members formed in the faceplate, said electrical connection members operable to engage the plug of said power cord;

a disconnection member, said disconnection member being disposed within the interior volume of said receptacle, said disconnection member configured to disengage the plug of said power cord;

a controller, said controller being disposed within a passenger compartment of the vehicle, said controller being communicably coupled to said receptacle, said controller being electrically coupled with the vehicle, said controller configured to detect a first state and a second state of the receptacle, said controller further configured to detect a running state of the vehicle; and wherein the controller is operable to eject the plug from the receptacle upon detection of the vehicle entering the running state and wherein the plug is being detected as being electrically coupled with said receptacle.

8. The vehicle heater decoupling system as recited in claim 7, wherein the receptacle further includes a pressure plate, said pressure plate being mounted within said faceplate of said housing, said pressure plate configured to provide an alternate technique of disconnecting the receptacle and the plug.

9. The vehicle heater decoupling system as recited in claim 8, and further including a sensor, said sensor configured to provide detection of said plug in said receptacle.

10. The vehicle heater decoupling system as recited in claim 9, wherein in said first state said receptacle has the plug operably coupled thereto; and wherein in said second state the receptacle is disengaged from said plug.

11. The vehicle heater decoupling system as recited in claim 10, wherein the controller is operable to detect a first mode and a second mode, wherein in the first mode a motor of the vehicle is detected in an idle state.

12. The vehicle heater decoupling system as recited in claim 11, wherein in the second mode the motor of the vehicle is detected in a running state.

13. The vehicle heater decoupling system as recited in claim 12, wherein said controller further includes a third mode, wherein in said third mode said controller is communicably coupled to a key fob operable to provide control of a locking system of the vehicle and wherein engagement of the key fob and detection of the first state results in ejection of the plug from the receptacle.

14. A vehicle heater decoupling system installed in a vehicle that is operable to ensure disconnection of a vehicle heater and its power source wherein the vehicle heater decoupling system comprises:

a receptacle, said receptacle having a housing, said housing defining an interior volume, said housing further including a faceplate, said receptacle being electrically coupled to a heater installed in a vehicle, said receptacle being configured to be electrically coupled to a plug of a power cord coupled to a power source, said power cord being operable to provide electrical current, said receptacle having electrical connection members formed in the faceplate, said electrical connection members operable to engage the plug of said power cord, said receptacle having a control board, said control board including the electronics to receive, store transmit and manipulate data, said receptacle having a sensor, said sensor being operably coupled to said electrical connection members, said sensor configured to provide detection of a first state and a second state of the receptacle;

a disconnection member, said disconnection member being disposed within the interior volume of said receptacle, said disconnection member being operably coupled with said electrical connection members, said disconnection member configured to disengage the plug of said power cord from said electrical connection members;

a controller, said controller being disposed within a passenger compartment of the vehicle, said controller being communicably coupled to said receptacle, said controller being electrically coupled with the vehicle, said controller having a visual indicator, said visual indicator configured to provide a visual signal as to whether or not said receptacle is operably coupled with said plug, said controller configured to detect a first state and a second state of the receptacle, said controller further configured to detect a running state of the vehicle; and wherein the controller is operable to eject the plug from the receptacle upon detection of the vehicle entering the running state and wherein the plug is being detected as being electrically coupled with said receptacle.

15. The vehicle heater decoupling system as recited in claim 14, wherein in the first state of the receptacle the plug is detected as being operably coupled therewith.

16. The vehicle heater decoupling system as recited in claim 15, wherein in the second state of the receptacle the plug is detected as being disconnected therefrom.

17. The vehicle heater decoupling system as recited in claim 16, wherein said controller is configured to transmit a signal to the receptacle upon detection of a running vehicle and the simultaneous detection of said first state.

18. The vehicle heater decoupling system as recited in claim 17, wherein said controller further includes a third mode, wherein in said third mode said controller is communicably coupled to a key fob operable to provide control of a locking system of the vehicle and wherein engagement of the key fob and detection of the first state results in ejection of the plug from the receptacle.

19. The vehicle heater decoupling system as recited in claim 18, wherein said controller further includes an audio alarm, said audio alarm configured to emit an audio alarm upon failure of a decoupling of the plug and the receptacle.

* * * * *